US009147402B2

(12) United States Patent
Chen et al.

(10) Patent No.: US 9,147,402 B2
(45) Date of Patent: Sep. 29, 2015

(54) METHOD AND APPARATUS FOR DETECTING WHICH ONE OF SYMBOLS OF WATERMARK DATA IS EMBEDDED IN A RECEIVED SIGNAL

(75) Inventors: Xiaoming Chen, Hannover (DE); Peter Georg Baum, Hannover (DE); Michael Arnold, Isernhagen (DE); Ulrich Gries, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 268 days.

(21) Appl. No.: 13/697,089

(22) PCT Filed: Apr. 27, 2011

(86) PCT No.: PCT/EP2011/056652

§ 371 (c)(1), (2), (4) Date: Nov. 9, 2012

(87) PCT Pub. No.: WO2011/141292

PCT Pub. Date: Nov. 17, 2011

(65) Prior Publication Data

US 2013/0073065 A1 Mar. 21, 2013

(30) Foreign Application Priority Data

May 11, 2010 (EP) .................................... 10305501

(51) Int. Cl.
*G10L 19/00* (2013.01)
*G10L 19/018* (2013.01)
*H04L 9/00* (2006.01)

(52) U.S. Cl.
CPC .................................. *G10L 19/018* (2013.01)

(58) Field of Classification Search
CPC .................... G10L 19/018; G06T 2201/0065; G06T 1/0078; G06T 2201/0052; G06T 1/0035; G06T 2201/0053
See application file for complete search history.

(56) References Cited

U.S. PATENT DOCUMENTS

| | | | | |
|---|---|---|---|---|
| 6,078,664 | A | 6/2000 | Moskowitz et al. | |
| 8,194,803 | B2 * | 6/2012 | Baum et al. | 375/343 |
| 2001/0029580 | A1 | 10/2001 | Moskowitz | |

(Continued)

FOREIGN PATENT DOCUMENTS

| | | |
|---|---|---|
| CN | 1694118 | 11/2005 |
| EP | 2081188 | 7/2009 |

(Continued)

*Primary Examiner* — Curtis Kuntz
*Assistant Examiner* — Thomas Maung
(74) *Attorney, Agent, or Firm* — Myers Wolin LLC

(57) ABSTRACT

Watermark symbol detection requires a detection metric for deciding at decoder side which candidate symbol is embedded inside the audio or video signal content. The invention provides an improved detection metric processing that achieves a reliable detection of watermarks in the presence of additional noise and echoes, and that is adaptive to signal reception conditions and requires a decreased computational power. This is performed by taking into account the information contained in the echoes of the received audio signal in the decision metric and comparing it with the corresponding metric obtained from decoding a non-marked audio signal, based on recursive calculation of false positive detection rates of peaks in correlation result values. The watermark symbol corresponding to the reference sequence having the lowest false positive error is selected as the embedded one.

6 Claims, 2 Drawing Sheets

(56) References Cited

U.S. PATENT DOCUMENTS

Figure 1:
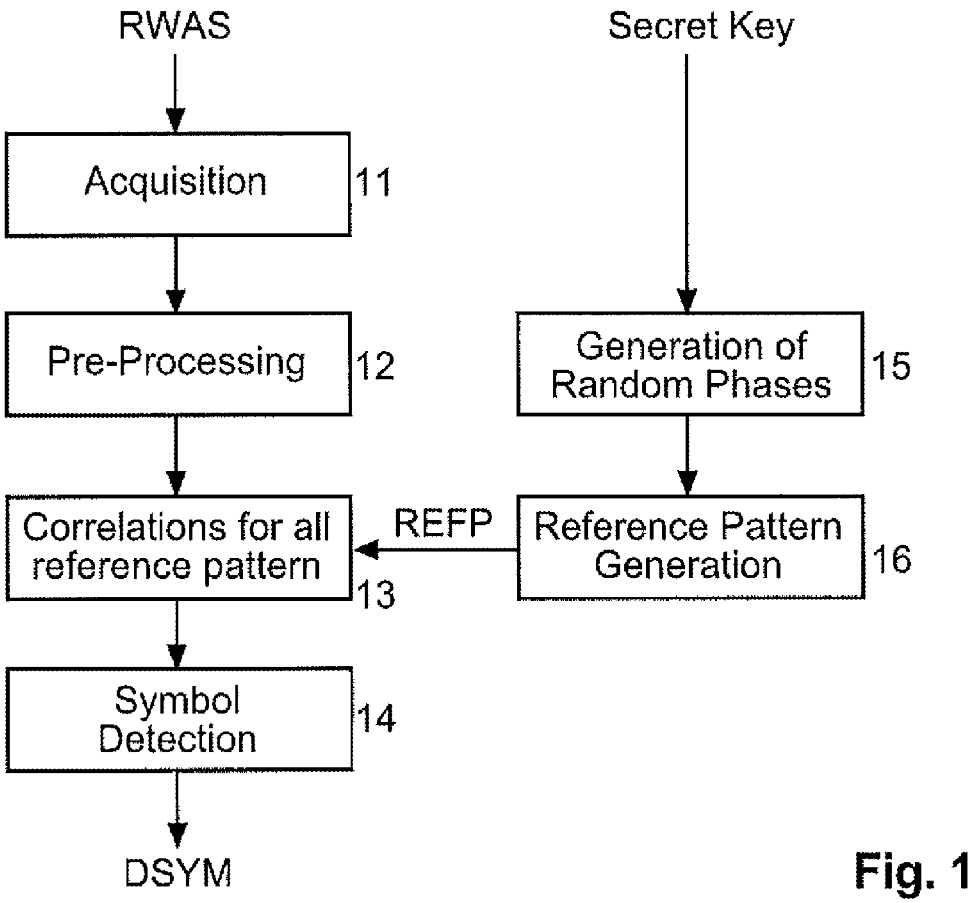

| | | | | |
|---|---|---|---|---|
| 2007/0011458 | A1 | 1/2007 | Moskowitz | |
| 2007/0165851 | A1* | 7/2007 | Roberts | 380/201 |
| 2010/0121608 | A1* | 5/2010 | Tian et al. | 702/181 |

FOREIGN PATENT DOCUMENTS

| | | |
|---|---|---|
| EP | 2175443 | 4/2010 |
| WO | WO0195239 | 12/2001 |

* cited by examiner

METHOD AND APPARATUS FOR DETECTING WHICH ONE OF SYMBOLS OF WATERMARK DATA IS EMBEDDED IN A RECEIVED SIGNAL

This application claims the benefit, under 35 U.S.C. §365 of International Application PCT/EP2011/056652, filed Apr. 27, 2011, which was published in accordance with PCT Article 21(2) on Nov. 17, 2011 in English and which claims the benefit of European patent application No. 10305501.8, filed May 11, 2010.

The invention relates to a method and to an apparatus for detecting which one of symbols of watermark data is embedded in a received signal, wherein following correlation with reference data sequences peak values in the correlation result are evaluated using false positive probability of wrong detection of the kind of symbol.

BACKGROUND

EP 2175443 A1 discloses a statistical detector that is used for detecting watermark data within an audio signal. Multiple peaks in a correlation result values sequence of length N (resulting from a correlation of a reference sequence with a corresponding section of the received audio signal) are taken into account for improving the detection reliability. The basic steps of this statistical detector are:

Find peak values $v_1 \geq \ldots \geq v_M$ in the correlation result values sequence for each candidate watermark symbol, where M is the number of peaks taken into consideration.

Calculate the false positive probability denoted as $P_{(M)}$ for the M peak values that the candidate watermark symbol is embedded.

The candidate watermark symbol with the lowest probability $P_{(M)}$ is selected as current watermark symbol.

$P_{(M)}$ is the probability of falsely accepting a candidate watermark symbol. It describes the probability of M or more correlation result values in an unmarked case (i.e. no watermark is present in the corresponding original signal section) being greater than or equal to the actual M peak values under consideration.

INVENTION

A non-recursive statistical detector could be used for the watermark detection but this would be inefficient and lead to difficulties for a large number of correlation result peaks.

For the evaluation of the probability $P_{(M)}$ of M or more values being greater than or equal to M peaks, all possible allocations of N correlation values are to be considered. For a small number M of peak values it is easy to manually list all possibilities, i.e. positions within the group of correlation results. However, for a larger number of M it becomes increasingly difficult to manually find all possibilities. Alternatively, instead of searching for probabilities of M or more correlation values being greater than or equal to M peak values, cases can be considered where less than M correlation values are greater than or equal to M peaks. But again, the problem is how to efficiently find all possibilities.

Known statistical detectors are using a fixed number of correlation peaks. However, due to the time-varying property of a received audio signal the number of peaks to be considered should be selected adaptively. That is, for a high signal-to-noise ratio SNR a small M is sufficient for the detection, whereas a greater M may be necessary for a low-SNR signal.

Therefore, using a number of peaks that is adaptive to the signal quality provides computational and technical advantages.

A problem to be solved by the invention is how to recursively and effectively evaluate the probability $P_{(M)}$ even for a large number M of correlation result peaks. This problem is solved by the method disclosed in claim 1. An apparatus that utilises this method is disclosed in claim 2.

According to the invention, the total false positive probability of multiple peaks in a correlation result values sequence is evaluated by calculating the complementary probability in a recursive manner. The complementary probability for a given number of peaks in turn can be calculated by using representative vectors identifying each individual probability. The problem of recursive calculation of the complementary probabilities is solved by a recursive construction processing for the representative vectors.

The probability $P_{(k+1)}$ for k+1 correlation result peaks is evaluated as the $P_{(k)}$ for k peaks minus the probabilities $P_{(i,k+1)}$ for cases ($\forall_i$) identified by vectors in the representative vector set for k+1 peaks:

$$P_{(k+1)} = P_{(k)} - \sum_i P_{(i,k+1)} = 1 - P_{(k)}^C - \sum_i P_{(i,k+1)} = 1 - P_{(k+1)}^C \quad (1)$$

Therefore the complementary probability $P_{(k+1)}^C$ for k+1 peaks is calculated recursively from the complementary probability $P_{(k)}^C$ for k peaks plus all the probabilities represented by the representative vectors for k+1 peaks. In addition the representative vectors for k+1 peaks are constructed recursively from the representative vectors for k peaks.

All occurrences of less than M correlation result values being greater than or equal to M peaks can be determined recursively and, as a consequence, $P_{(M)}$ can be evaluated recursively, which kind of processing yields effectiveness and adaptivity.

Advantageously, the recursive evaluation of $P_{(M)}$ enables a statistical detector feature in which the number M of considered peaks can be increased gradually and adaptively. In addition, the recursive evaluation of $P_{(M)}$ minimises the computational complexity by re-using previously performed calculations.

In principle, the inventive method is suited for detecting which one of symbols of watermark data embedded in an original signal—by modifying sections of said original signal in relation to at least two different reference data sequences—is present in a current section of a received version of the watermarked original signal, wherein said received watermarked original signal can include noise and/or echoes, said method including the steps:

correlating in each case said current section of said received watermarked signal with candidates of said reference data sequences;

based on peak values in the correlation result values for said current signal section, detecting—using related values of false positive probability of detection of the kind of symbol—which one of the candidate symbols is present in said current signal section, wherein that said false positive probability is calculated in a recursive manner, and wherein the total false positive probability for a given number of correlation result peak values is evaluated by using initially the false positive probabilities for a number smaller than said given of correlation result peak values, and by increasing gradually the number of considered correlation result peak values according to the required detection reliability.

In principle the inventive apparatus is suited for detecting which one of symbols of watermark data embedded in an original signal—by modifying sections of said original signal in relation to at least two different reference data sequences—is present in a current section of a received version of the watermarked original signal, wherein said received watermarked original signal can include noise and/or echoes, said apparatus including means being adapted for:

- correlating in each case said current section of said received watermarked signal with candidates of said reference data sequences;
- based on peak values in the correlation result values for said current signal section, detecting—using related values of false positive probability of detection of the kind of symbol—which one of the candidate symbols is present in said current signal section, wherein said false positive probability is calculated in said symbol detection means in a recursive manner, and wherein the total false positive probability for a given number of correlation result peak values is evaluated by using initially the false positive probabilities for a number smaller than said given of correlation result peak values, and by increasing gradually the number of considered correlation result peak values according to the required detection reliability.

Advantageous additional embodiments of the invention are disclosed in the respective dependent claims.

DRAWINGS

Figure 2:
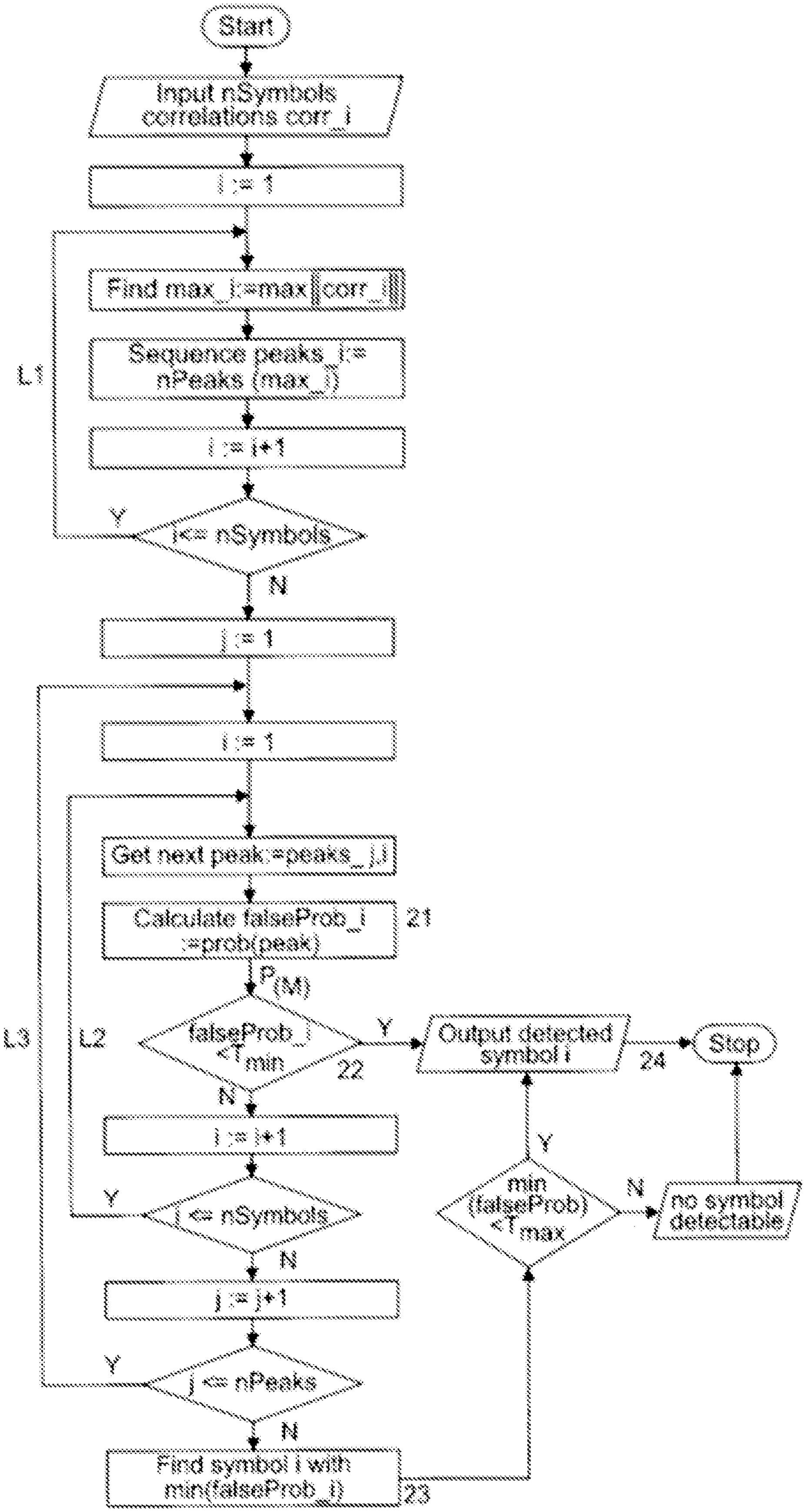

Exemplary embodiments of the invention are described with reference to the accompanying drawings, which show in:

FIG. 1 block diagram of the inventive detector;

FIG. 2 flow diagram of the inventive processing.

EXEMPLARY EMBODIMENTS

The inventive processing evaluates the probability $P_{(M)}$ from its complementary probability, i.e. the probability of less than M correlation values being greater than or equal to M peaks.

For a specific correlation result peak value $v_i$, the probability of one correlation result value being greater than or equal to $v_i$—under the assumption that the candidate watermark does not exist—is denoted as $p_i$, which is the false positive probability in case the magnitude of value $v_i$ is used as the threshold value to detect the candidate watermark symbol.

For convenience, a vector $a_i^{(k)}=(a_{i,k}, a_{i,k-1}, \ldots, a_{i,1})$ with non-negative integer elements is introduced to represent an allocation of correlation result values with respect to k peaks (denoted by superscript k). The set of all vectors $a_i^{(k)}$ belonging to k peaks is indexed by subscript i. In the sequel, such a vector is referred to as a representative vector. Specifically, $a_{i,l}, l\neq 1$ indicates that there are $a_{i,l}$ correlation values in the interval $[v_l, v_{l-1}]$, and $a_{i,1}$ indicates that there are $a_{i,1}$ correlation values greater than or equal to $v_1$ (in the interval $[v_1,+\infty)$). In addition there are k−1 values greater than or equal to $v_k$, whereas the remaining N−(k−1) correlation values are smaller than $v_k$. Consequently, the probability for the case represented by $a_i^{(k)}$ can be evaluated as $$P_{a_i^{(k)}} = (1-p_k)^{N-(k-1)} \prod_{l=1}^{k} \binom{N - \sum_{j=0}^{l-1} a_{i,j}}{a_{i,l}} (p_l - p_{l-1})^{a_{i,l}}, \tag{2}$$

with $p_0 = a_{i0} = 0$.

In the sequel, Case k is used to denote the case where there are exactly k−1 values greater than or equal to k−1 peaks $v_{k-1}, \ldots, v_1$ but no value lies within interval $[v_k, v_{k-1}]$ Therefore, Cases 1 to k together correspond to the case that there are no more than k−1 values greater than or equal to k peaks $v_k, \ldots, v_1$. And the complementary case for Cases 1 to k together is that there are k or more values greater than or equal to k peaks $v_k, \ldots, v_1$.

If $P_{(k)}$ denotes the probability for Case k, then $$P_{(k+1)} = P_{(k)} - \sum_i P_{(i,k+1)}.$$

That is, the total probability for k+1 peaks is just the total probability for k peaks minus an additional sum of the probabilities $$\sum_i P_{(i,k+1)}.$$

The individual probabilities $P_{(i,k+1)}=P_{a_i^{(k+1)}}$ are calculated according to equation (2) using the vector $a_i^{(k+1)}$.

As an example, the following Cases 1, 2 and 3 are considered:

Case 1

There is no correlation value greater than or equal to $v_1$. The representative vector is $a_1^{(1)}=(0)$.

Case 2

There is one value greater than or equal to $v_1$ and no value lies within interval $[v_2, v_1]$, represented by a vector $a_1^{(2)}=(0, 1)$.

Case 3, with Two Alternatives:

(i) There are two values greater than or equal to $v_1$ and no value lies within interval $[v_3, v_1]$.

(ii) There is one value greater than or equal to $v_1$, one value within interval $[v_2, v_1]$, and no value within interval $[v_3, v_2]$.

The corresponding vectors for Case 3 are $a_1^{(3)}=(0,0,2)$ and $a_2^{(3)}=(0,1,1)$. Case 3 is disjoint to Case 2 and Case 1. Moreover, Case 3 corresponds to a case where there are exactly two values greater than or equal to two peaks $v_2$, $v_1$ and no value lies within interval $[v_3, v_2]$.

Cases 1, 2 and 3 together correspond to a case where there are no more than two values greater than or equal to three peaks $v_3$, $v_2$ and $v_1$.

Given all disjoint representative vectors (indexed by i) for Case k, the probability $$\sum_i P_{(i,k)}$$

is the summation of probabilities of the events represented by these vectors, where each event probability can be evaluated according to Equation (2).

Then, the problem is how to recursively obtain representative vectors for Case k. Let $S^{(k)}$ denote a set of representative vectors and $L^{(k)}$ a set of lowest positions of '1' in the unit vectors (note that a unit vector has a single '1' element only whereas all other elements are '0') to be added to a representative vector in $S^{(k)}$. For each vector in $S^{(k)}$ there exists one corresponding position value in $L^{(k)}$. The meaning of $L^{(k)}$ will become clear in the following.

A recursive construction procedure for $S^{(k)}$ and $L^{(k)}$ is carried out:

(1) Initialisation

Set the recursion step k=1, and initialise $S^{(1)}=\{(0)\}$, $L^{(1)}=\{1\}$.

(2) Adding unit vector and extending

For each vector in $S^{(k)}$, say $a_i^{(k)}$, add it with unit vectors $u_{j_i}^{(k)}$ (wherein $u_{j_i}^{(k)}$ denotes a unit vector of length k with value '1' at position $j_i$), $l_i^{(k)} \le j_i \le k$, where $l_i^{(k)}$ is the element in $L^{(k)}$ corresponding to $a_i^{(k)}$ and the lowest possible position of the value '1' in $u_{j_i}^{(k)}$. The resulting vectors after adding a unit vector are extended by a leading value '0'. Specifically, a new representative vector is obtained from $a_i^k$ following adding and extending $a_m^{(k+1)}=(0,a_i^{(k)}+u_{j_i}^{(k)})$, which is included in the new vector set $S^{(k+1)}$.

The leading value '0' in $a_m^{(k+1)}$ indicates that there is no correlation value in the interval $[\nu_{k+1}, \nu_k]$, and adding a unit vector $u_{j_i}^{(k)}$ indicates that there are exactly k values greater than or equal to $\nu_k, \ldots, \nu_1$. The adding position corresponding to $a_m^{(k+1)}$ is $l_m^{(k+1)}=j_i$, which is included in the new position set $L^{(k+1)}$.

(3) Update

Increase k by one: k←k+1. If k<M, go back to step (2), otherwise the recursion is finished.

As an example, the first three steps of the recursive construction procedure are shown in the following:

For k=2, a unit vector (1) is added to the vector (0) and the resulting vector (1) is extended by a leading zero, i.e. leading to vector $S^{(2)}=\{(0,1)\}$ with lowest position $L^{(2)}=\{1\}$.

| Vectors in $S^{(1)}$ | Unit vectors $u_{j_i}^{(2)}$ corresponding to $a_i^{(2)}$ | Result | Extend |
|---|---|---|---|
| (0) | (1) | (1) | (0, 1) |

For k=3, because $L^{(2)}=\{1\}$, $1 \le j_i \le 2$, to vector (0,1) two unit vectors (0,1) and (1,0) (with lowest positions 1 and 2) are added resulting in vectors (0,2) and (1,1). Again, these vectors are each extended by a leading zero.

| Vectors in $S^{(2)}$ | Unit vectors $u_{j_i}^{(3)}$ corresponding to $a_i^{(3)}$ | Result | Extend |
|---|---|---|---|
| (0, 1) | (0, 1) | (0, 2) | (0, 0, 2) |
| | (1, 0) | (1, 1) | (0, 1, 1) |

The corresponding lowest positions are still 1 and 2, respectively. Thus, the vectors $S^{(3)}=\{(0,0,2),(0,1,1)\}$ and the lowest positions $L^{(3)}$32 {1,2} are obtained.

For k=4, the adding position 1 for $L^{(3)}$ will result in three adding positions 1,2,3 (since $1 \le j_i \le 3$) while the adding position 2 for $L^{(3)}$ will result in two adding positions 2,3 (since $2 \le j_i \le 3$).

| Vectors in $S^{(3)}$ | Unit vectors $u_{j_i}^{(4)}$ corresponding to $a_i^{(4)}$ | Result | Extend |
|---|---|---|---|
| (0, 0, 2) | (0, 0, 1) | (0, 0, 3) | (0, 0, 0, 3) |
| | (0, 1, 0) | (0, 1, 2) | (0, 0, 1, 2) |
| | (1, 0, 0) | (1, 0, 2) | (0, 1, 0, 2) |
| (0, 1, 1) | (0, 1, 0) | (0, 2, 1) | (0, 0, 2, 1) |
| | (1, 0, 0) | (1, 1, 1) | (0, 1, 1, 1) |

Accordingly, $S^{(4)}=\{(0,0,0,3), (0,0,1,2), (0,1,0,2), (0,0,2,1), (0,1,1,1)\}$ and $L^{(4)}=\{1,2,3,2,3\}$, where the first three vectors are generated via (0,0,2) in $S^{(3)}$ with adding positions 1,2,3 and the last two vectors are generated via (0,1,1) in $S^{(3)}$ with adding positions 2,3.

$S^{(1)}$, $S^{(2)}$, $S^{(3)}$ and $S^{(4)}$ include all representative vectors corresponding to Cases 1, 2, 3, and 4. By means of induction it can be generally proved that the recursively constructed vector set $S^{(k)}$ corresponds to Case k, i.e. there are exactly k−1 values greater than or equal to k−1 peaks $\nu_{k-1}, \ldots, \nu_1$ and there is no value within interval $[\nu_k, \nu_{k-1}]$.

Following each recursion step for $S^{(k)}$ and $L^{(k)}$, the total probability $P_{(k)}$ can be calculated, which is the total probability of the previous step k−1 minus the probability $$\sum_i P_{(i,k)} \text{ for } S^{(k)}.$$

That is, the computational efforts for total probability evaluation of previous steps are recursively used in the current step. Because $$P_{(k)} = P_{(k-1)} - \sum_i P_{(i,k)}$$

and $$\sum_i P_{(i,k)} > 0,\ \forall\, k,$$

the probability $P_{(k)}$ will decrease from one step to the next. If the current total probability $P_{(k)}$ is already small enough, e.g. smaller than an application-dependent probability value for false positive detection, the recursion can be stopped.

A further speed-up of the calculation of the false positive probability can be obtained by storing the binomial coefficients $$\binom{N - \sum_{j=0}^{l-1} a_{i,j}}{a_{i,l}}$$

of equation (2), because the correlation length N and the vector sets can be calculated for a given number of peaks k. The only data-dependent values in equation (2) are the factors $(1-p_k)^{N-(k-1)}$ and $(p_1-p_{l-1})^{a_{i,l}}$, which are depending on the false positive probabilities $p_1$ of the individual peaks.

In the watermark decoder block diagram in FIG. 1, a received watermarked signal RWAS is re-sampled in a acquisition or receiving section step or stage 11, and thereafter may pass through a pre-processing step or stage 12 wherein a spectral shaping and/or whitening is carried out. In the following correlation step or stage 13 it is correlated section by section with one or more reference patterns REFP. A symbol detection or decision step or stage 14 determines, according to the inventive processing described above, whether or not a corresponding watermark symbol DSYM is present. In an optional downstream error correction step or stage (not depicted) the preliminarily determined watermark information bits of such symbols can be error corrected, resulting in a corrected detected watermark symbol DSYM.

At watermark encoder side, a secret key was used to generate pseudo-random phases, from which related reference pattern bit sequences (also called symbols) were generated and used for watermarking the audio signal. At watermark decoder side, these pseudo-random phases are generated in the same way in a corresponding step or stage 15, based on the same secret key. From the pseudo-random phases, related candidate reference patterns or symbols REFP are generated in a reference pattern generation step or stage 16 and are used in step/stage 13 for checking whether or not a related watermark symbol is present in the current signal section of the received audio signal.

In FIG. 2 the inventive processing is depicted. Within a first loop L1, for each symbol i the maximum correlation result peak value for the current signal section is determined, and a given number of peak values next in size—e.g. the five greatest peak values for each symbol i are determined, e.g. by sorting.

Loop L2 runs over the symbols i and loop L3 runs over the correlation result peaks j. In L2, the false positive probability $P_{(M)}$ for a current peak is calculated in step 21 as explained in detail above. In case that probability is smaller than a threshold value $T_{min}$ in step 22, it is assumed that a correct symbol was detected, that symbol is output in step 24 and the processing is finished. Otherwise the processing continues in loop L2 for the next symbol and in loop L3 for the peaks next in size.

In case none of the checked probabilities was smaller than $T_{min}$, the symbol resulting in the overall minimum false positive probability is selected in step 23.

As an option, a second threshold value $T_{max}$ can be used in a step 25 for checking whether the minimum min(falseProb_i) of all false positive probability values over i is greater than the first threshold value $T_{min}$ but still smaller than a second threshold value $T_{max}$ greater than $T_{min}$. If true, the corresponding symbol i is output in step 24. Otherwise, no symbol is detectable.

The invention claimed is:

1. A method for detecting which one of symbols of watermark data embedded in an original audio signal, by modifying sections of said original audio signal in relation to at least two different reference data sequences, is present in a current section of a received version of the watermarked original audio signal, wherein said received watermarked original audio signal can include at least one of noise and echoes, said method comprising:

correlating in each case said current section of said received watermarked signal with candidates of said reference data sequences;

based on peak values in the correlation result values for said current signal section, detecting, using related values of false positive probability of detection of the kind of symbol, which one of the candidate symbols is present in said current signal section;

wherein said false positive probability is calculated in a recursive manner, wherein a total false positive probability for a given number of correlation result peak values is evaluated by using initially the false positive probabilities for a number smaller than said given number of correlation result peak values, and by increasing gradually the number of considered correlation result peak values according to the required detection reliability, and wherein for a first peak value and a first one of said candidate symbols said false positive probability is calculated, and a) if the corresponding false positive probability is smaller than a predetermined threshold value, assuming the current candidate symbol to be the correct symbol;

b) if said false positive probability is not smaller than said predetermined threshold value, calculating said false positive probability for said first peak value for the following one of said candidate symbols and the processing continues with a);

c) if none of the calculated false positive probability values is smaller than said predetermined threshold value, continuing a) and optionally continuing b) for a following one of said peak values;

d) if none of the calculated false positive probability values is smaller than said predetermined threshold value, assuming the candidate symbol for which the minimum false positive probability has been calculated to be the correct symbol.

2. The method according to claim 1, wherein a total value of the false positive probability of multiple peaks is determined by calculating the complementary probability in a recursive manner, and wherein the complementary probability for a given number of peaks is calculated by using representative vectors identifying each individual probability.

3. The method according to claim 2, wherein the complementary probability for k+1 peaks is calculated recursively from the complementary probability for k peaks plus all the probabilities represented by the representative vectors for k+1 peaks, and wherein the representative vectors for k+1 peaks are constructed recursively from the representative vectors for k peaks.

4. An apparatus for detecting which one of symbols of watermark data embedded in an original audio signal, by modifying sections of said original audio signal in relation to at least two different reference data sequences, is present in a current section of a received version of the watermarked original audio signal, wherein said received watermarked original audio signal can include at least one of noise and echoes, said apparatus comprising:

a memory; and at least one processor configured to:

correlate in each case said current section of said received watermarked signal with candidates of said reference data sequences;

based on peak values in the correlation result values for said current signal section, determine, using related values of false positive probability of detection of the kind of symbol, which one of the candidate symbols is present in said current signal section;

wherein said false positive probability is calculated in a recursive manner, wherein a total false positive probability for a given number of correlation result peak values is evaluated by using initially the false positive probabilities for a number smaller than said given number of correlation result peak values, and by increasing gradually the number of considered correlation result peak values according to the required detection reliability, and wherein for a first peak value and a first one of said candidate symbols said false positive probability is calculated; and a) if the corresponding false positive probability is smaller than a predetermined threshold value, the current candidate symbol is assumed to be the correct symbol;

b) if said false positive probability is not smaller than said predetermined threshold value, said false positive probability for said first peak value is calculated for the following one of said candidate symbols and the processing continues with a);

c) if none of the calculated false positive probability values is smaller than said predetermined threshold value, a) and optionally continuing b) are continued for a following one of said peak values;

d) if none of the calculated false positive probability values is smaller than said predetermined threshold value, the candidate symbol for which the minimum false positive probability has been calculated is assumed to be the correct symbol.

5. The apparatus according to claim 4, wherein a total value of the false positive probability of multiple peaks is determined by calculating the complementary probability in a recursive manner, and wherein the complementary probability for a given number of peaks is calculated by using representative vectors identifying each individual probability.

6. The apparatus according to claim 5, wherein the complementary probability for k+1 peaks is calculated recursively from the complementary probability for k peaks plus all the probabilities represented by the representative vectors for k+1 peaks, and wherein the representative vectors for k+1 peaks are constructed recursively from the representative vectors for k peaks.

* * * * *